(12) United States Patent
Lee (10) Patent No.: US 7,134,358 B2
(45) Date of Patent: *Nov. 14, 2006

(54) TILT STEERING APPARATUS FOR VEHICLE

(75) Inventor: Byeong-Hoon Lee, Kyunggi-do (KR)

(73) Assignee: Hyundai Mobis Co., Ltd., Yongin-shi (KR)

( * ) Notice: Subject to any disclaimer, the term of this patent is extended or adjusted under 35 U.S.C. 154(b) by 356 days.

This patent is subject to a terminal disclaimer.

(21) Appl. No.: 10/649,809

(22) Filed: Aug. 28, 2003

(65) Prior Publication Data

US 2004/0200305 A1 Oct. 14, 2004

(30) Foreign Application Priority Data

Apr. 9, 2003 (KR) ........................ 10-2003-0022258

(51) Int. Cl.
*B62D 1/18* (2006.01)
(52) U.S. Cl. .......................................... 74/493; 280/775
(58) Field of Classification Search .................. 74/493, 74/492, 388 PS; 280/775
See application file for complete search history.

(56) References Cited

U.S. PATENT DOCUMENTS

| 4,593,577 | A | * | 6/1986 | Kinoshita | ..................... 74/493 |
|---|---|---|---|---|---|
| 5,143,402 | A | * | 9/1992 | Higashino et al. | .......... 280/775 |
| 5,452,624 | A | * | 9/1995 | Thomas et al. | ................ 74/493 |
| 6,282,977 | B1 | * | 9/2001 | Satoh et al. | ................... 74/493 |
| 6,591,709 | B1 | * | 7/2003 | Kim et al. | ..................... 74/493 |

FOREIGN PATENT DOCUMENTS

JP 11198821 7/1999

OTHER PUBLICATIONS

English Language Abstract of JP2000-11-198821.

* cited by examiner

*Primary Examiner*—Richard Ridley
*Assistant Examiner*—Justin Krause
(74) *Attorney, Agent, or Firm*—Greenblum & Bernstein, P.L.C.

(57) ABSTRACT

The present invention relates, in general, to a tilt steering apparatus for a vehicle, and more specifically, to a tilt steering apparatus for a vehicle, capable of adjusting the angle of a steering column by engaging a movable gear with a fixed gear or disengaging the movable gear from the fixed gear, using a lock slider that does a rectilinear motion by an operation lever. If the lock slider is separated from the operation lever, even when the operation lever rotates, the lock slider does a rectilinear motion only. Hence, the lock slider and the movable gear can always make the line contact with each other. Through this line contact, the supporting rigidity and the abrasion resistance of components can be improved.

29 Claims, 6 Drawing Sheets

TILT STEERING APPARATUS FOR VEHICLE

The present disclosure is related to the prior foreign application No. 10-2003-22258 filed on 9 Apr. 2003 in Republic of Korea (KR).

BACKGROUND OF THE INVENTION

1. Field of the Invention

The present invention relates, in general, to a tilt steering apparatus for a vehicle. More specifically, the present invention relates to a tilt steering apparatus for a vehicle, capable of adjusting the angle of a steering column by engaging a movable gear with a fixed gear or disengaging the movable gear from the fixed gear, using a lock slider that does a rectilinear motion by an operation lever.

2. Description of the Related Art

A tilt steering (also called 'tilt handle'), as the name implies, indicates an inclined steering wheel. In other words, the angle of a steering column can be adjusted according to the physical figure (physique) or driving posture of a driver.

Although the height of the steering wheel is adjusted by manually disengaging a movable gear from a fixed gear using a lever attached to the steering column, an electric steering is also available.

Figure 1:
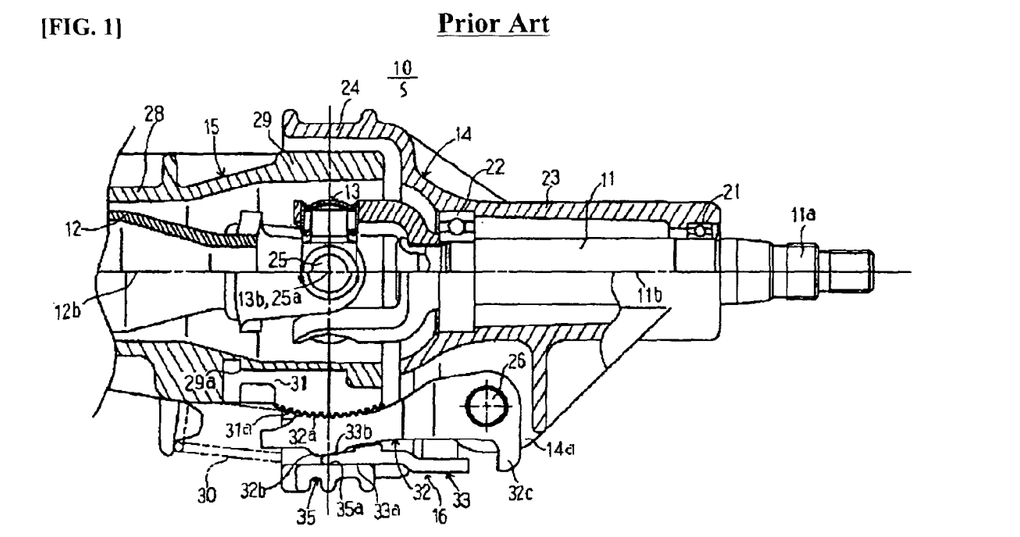
FIG. 1 is a side cross-sectional view of a tilt apparatus in a steering column according to a related art.
Figure 2:
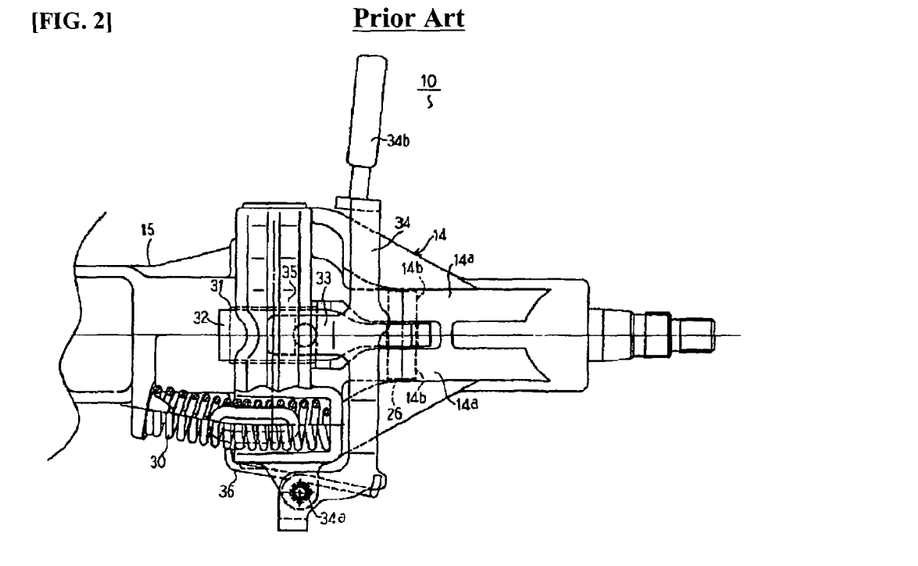
FIG. 2 is a bottom view of the tilt apparatus in FIG. 1.

FIG. 1 is a side cross-sectional view of a tilt apparatus in a steering column according to a related art, and FIG. 2 is a bottom view of the tilt apparatus in FIG. 1.

In particular, the tilt apparatus for the steering column shown in these drawings was disclosed in Japanese Patent Publication No. 1999-198821. Referring to the drawings, there is an lower bracket 31 that is attached to the lower portion of the steering column 11 so as to adjust the same, and a fixed gear 31a is formed on the lower portion of the lower bracket 31.

A movable gear 32 is also attached to the lower portion of the lower bracket 31 in such a manner that the movable gear is tooth-locked to the fixed gear 31a and one side thereof is hinged 26, being pivotably movable. A bottom surface 32b of the movable gear is curved.

In addition, a lock slider 33 is attached to the lower portion of the movable gear 32, being combined with an operation lever 34 as one body. The lock slider 33 slides along the bottom surface 32a of the movable gear, to engage/disengage the movable gear 32 to/from the fixed gear 31a.

Figure 3:
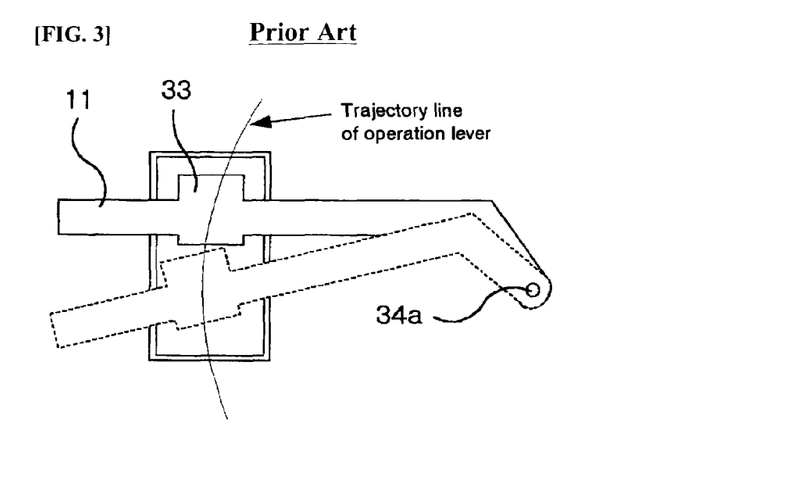
FIG. 3 diagrammatically illustrates an operational state of the tilt apparatus in a steering column according to the related art.

FIG. 3 diagrammatically illustrates an operational state of the related art tilt apparatus for the steering column.

As depicted in FIG. 3, if the operation lever 34 pivots on the hinge 34a, the lock slider 33, which is combined with the operation lever 34 as one body, correspondingly does the rectilinear motion, while rotating at the same time, along the bottom surface 32b of the movable gear. In this way, the movable gear 32 is either locked to the fixed gear 31a or disengaged from the fixed gear 31a, thereby adjusting the steering column 11.

However, since the lock slider and the operation lever are combined with each other, the assembling work associated with these two components with complicated structures is often difficult. Also, if someone wants to change one of them, he has to change both of them, spending unnecessary cost.

Moreover, the lock slider requires more space to do the rotational motion. Taking apart the unnecessary space required, the lock slider can hurt the driver while rotating.

Another defect of the related art tilt steering apparatus is that although the operation lever is in a position for locking the movable gear, if the operation lever 34 rotates more or less than it is supposed to in the locking position because of a minor error in the manufacture of components, or if the operation lever 34 rotates, the lock slider 33 combined with the operation lever 34 correspondingly rotates and at the same time does the vertical rectilinear motion. As a result, the bottom surface 32b of the movable gear and the lock slider 33 make a point contact, not a line contact, and thus the supporting rigidity and the abrasion resistance of both components are deteriorated.

SUMMARY OF THE INVENTION

It is, therefore, an object of the present invention to provide a tilt steering apparatus for a vehicle having a separated operation lever and lock slider, whereby the lock slider does only the rectilinear motion when the operation lever does the rotational motion, consequently. Thus, a space for the rotation of the lock slider is not required any more, and the bottom surface of a movable gear and the lock slider can always make the line contact with each other.

To achieve the above object, there is provided a tilt steering apparatus for a vehicle, which includes: a lower bracket mounted on a steering column; a fixed gear formed on a bottom surface of the lower bracket; a movable gear having a top surface toothed to the fixed gear, the movable gear being pivotably movable on a hinge formed at one side thereof; a lock slider that disengagably locks the movable gear to the fixed gear; a support bracket that supports the lock slider; an operation lever having one side hinged for rotation; and a motion converter that converts a rotational motion of the operation lever to a rectilinear motion of the lock slider.

The motion converter comprises a guide groove formed on the lock slider so as to position the operation lever.

Here, the width of the guide groove is preferably greater than the width of the operation lever.

Also, a circular portion having a diameter equal to the width of the guide groove is additionally formed on the operation lever disposed in the guide groove.

Preferably, borderlines on both sides of the guide groove are parallel to each other.

The motion converter is formed by hinging the operation lever and the lock slider together.

The bottom surface of the movable gear is preferably curved or inclined.

In the embodiment, a downward refraction portion is further formed on a tip portion of one side of the movable gear; and an extension portion is also formed on a tip portion of one side of the lock slider. As such, the downward refraction portion and the extension portion contact with each other when the movable gear is released.

A spring attached to the tip portion of one side and/or the other side of the lock slider provides the lock slider with a resilient force. Also, a spring can be attached to the operation lever as well.

BRIEF DESCRIPTION OF THE DRAWINGS

The above objects, features and advantages of the present invention will become more apparent from the following detailed description when taken in conjunction with the accompanying drawings, in which.

DETAILED DESCRIPTION OF THE PREFERRED EMBODIMENT

A preferred embodiment of the present invention will be described herein below with reference to the accompanying drawings. In the following description, well-known functions or constructions are not described in detail since they would obscure the invention in unnecessary detail.

Figure 4:
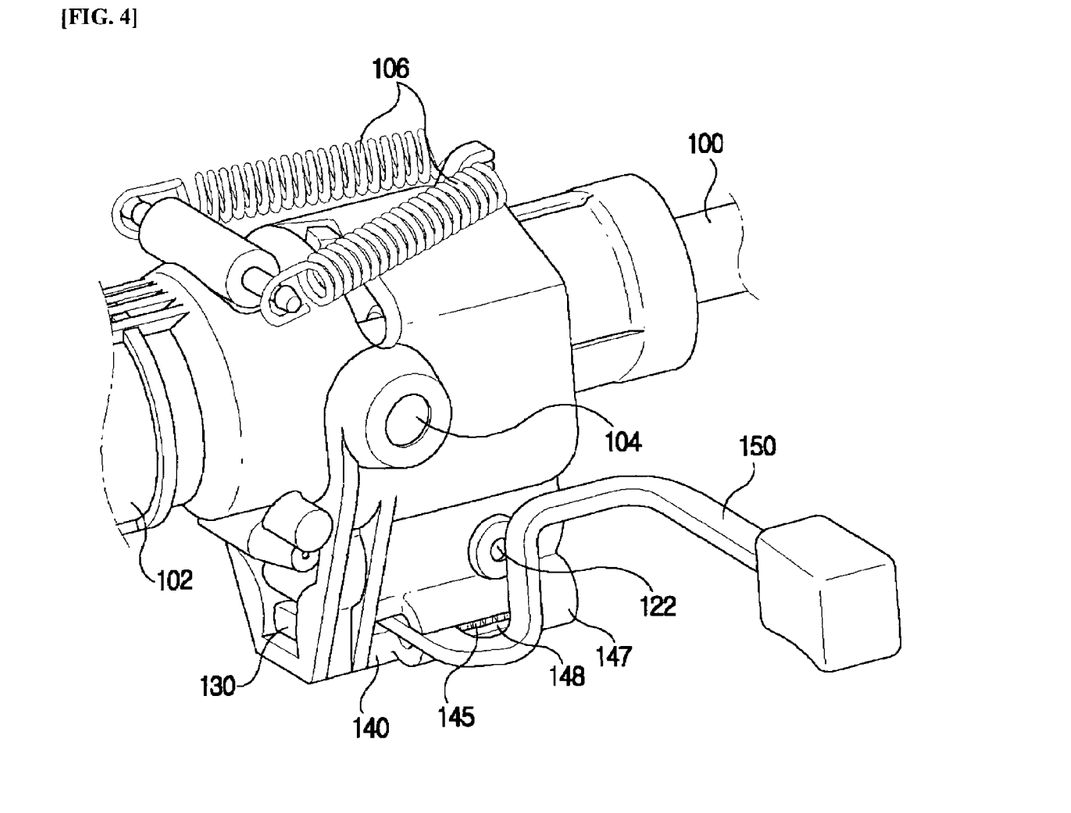
FIG. 4 is a perspective view of a tilt apparatus according to one embodiment of the present invention.
Figure 5:
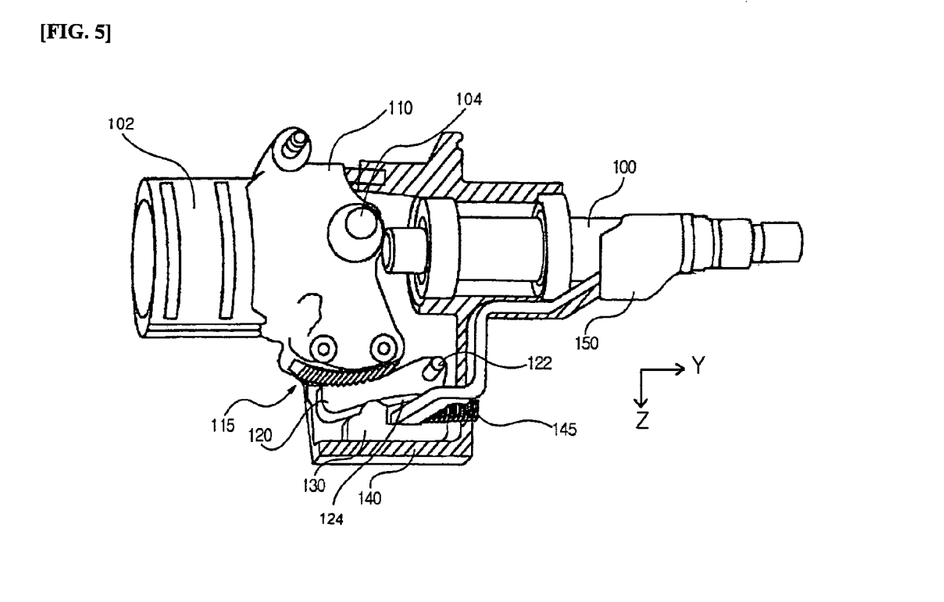
FIG. 5 is a cross-sectional perspective view of the tilt apparatus according to one embodiment of the present invention.
Figure 6:
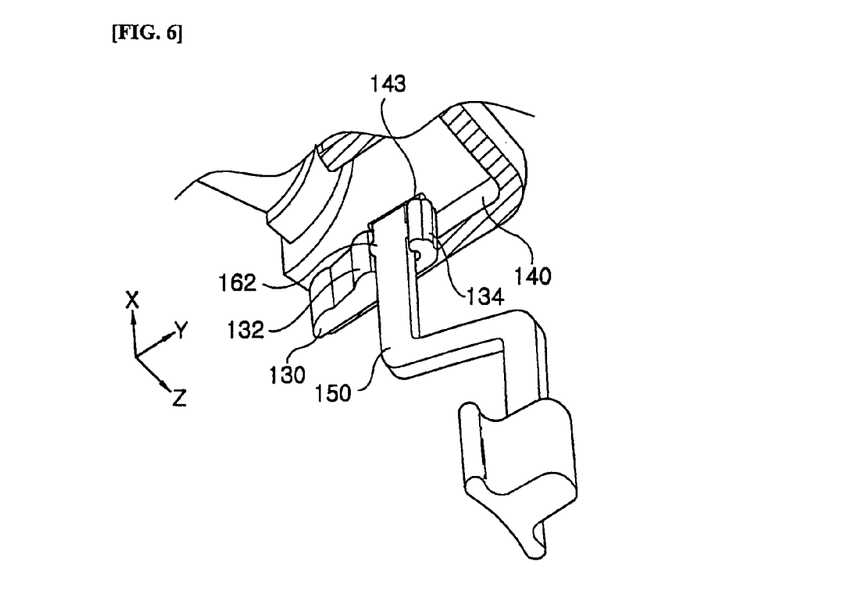
FIG. 6 is a partial cross-sectional view of the major part of FIG. 5.
Figure 7:
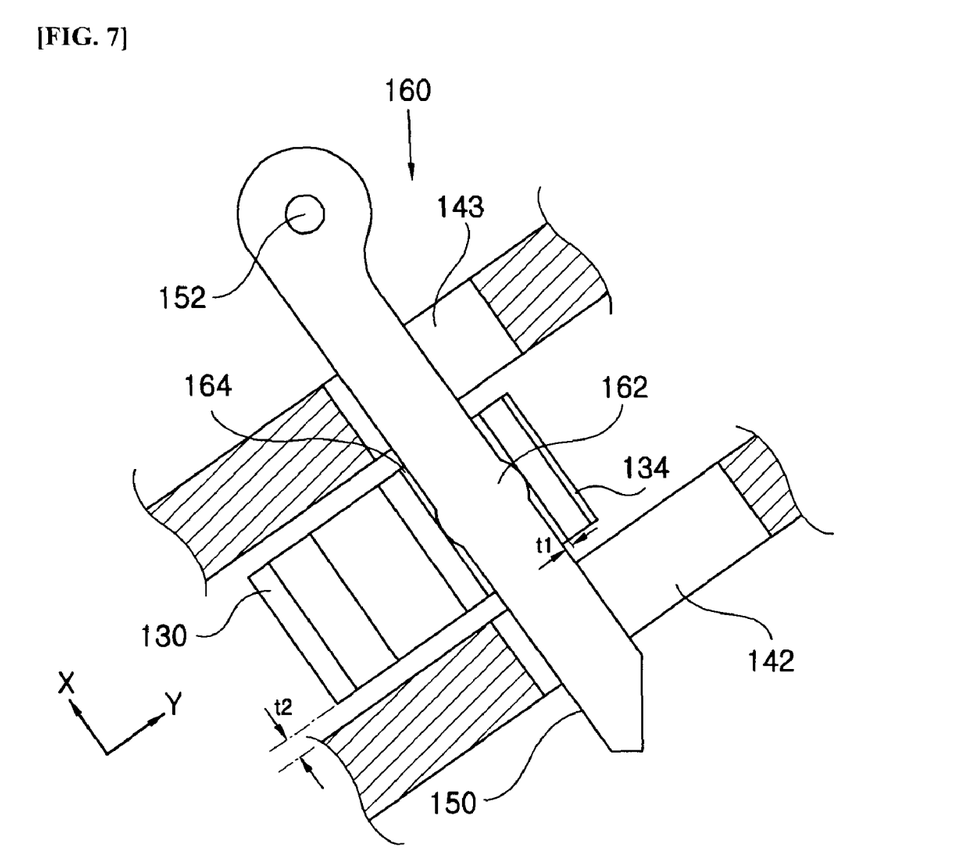
FIG. 7 is a plan view of the major part of FIG. 5.
Figure 8:
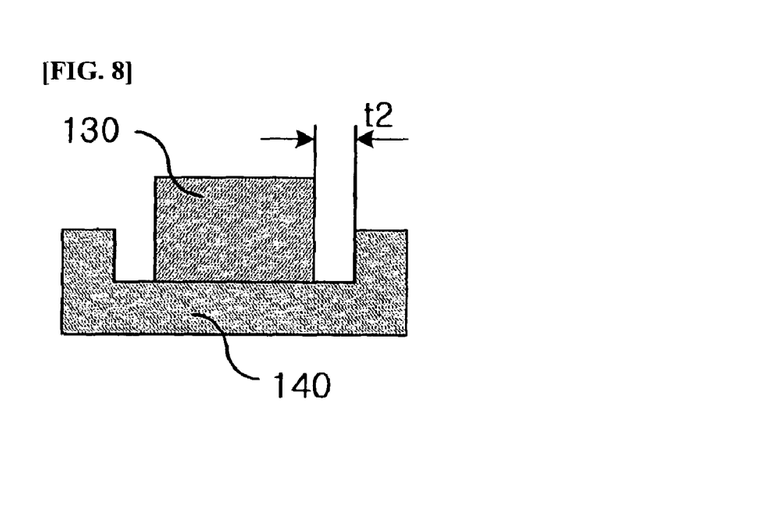
FIG. 8 is a cross-sectional view depicting a lock slider and a supporting bracket.

FIG. 4 is a perspective view of a tilt apparatus according to one embodiment of the present invention, FIG. 5 is a cross-sectional perspective view of the tilt apparatus according to one embodiment of the present invention, FIG. 6 is a partial cross-sectional view of the major part of FIG. 5, FIG. 7 is a plan view of the major part of FIG. 5, and FIG. 8 is a cross-sectional view depicting a lock slider and a supporting bracket.

As depicted in FIGS. 4 through 8, the tilt steering apparatus of the present invention includes a lower bracket 110 attached to a lower steering column 102, a fixed gear 115 formed on the bottom surface of the lower bracket 110, a movable gear 120 having the top surface being toothed to the fixed gear 115 and one side being hinged to be able to pivot, a lock slider 130 for engaging (locking) or disengaging the movable gear 120 with or from the fixed gear 115, a support bracket 140 for supporting the lock slider 130, a pivotably movable operation lever 150 having one side coupled to a hinge 152, and a motion converter 160 for converting the rotational motion of the movable gear 120 to the rectilinear motion of the lock slider 130.

In particular, the upper steering column 100 to be adjusted and the lower steering column 102 are coupled to each other by a hinge 104.

The hinge 104 is preferably a ball joint so as to adjust the upper steering column 100 in the horizontal and vertical directions.

Also, the upper portions of the upper steering column 100 and lower steering column 102 are connected by a spring 106. As such, if the fixed gear is disengaged from the movable gear, the upper steering column 100 is automatically adjusted to a pre-determined standard position by the elastic force of the spring 106 as long as the driver presses the upper steering column 100.

Here, the standard position indicates a suitable position of a steering wheel for an ordinary adult. It is generally set up by adjusting the elastic modulus of the spring 106.

The bottom surface of the movable gear 120 is curved or tilted. Preferably, this curve gets steep toward the hinge 122 direction of the movable gear.

Since the lock slider slides as it contacts with the bottom surface of the movable gear 120, it can be in any shape including square, circle or oval. Preferably, a protrusion 132 is formed on the upper portion of the lock slider 130 in order to encourage more contact with the bottom surface of the movable gear 120 and to facilitate the rotation of the movable gear 120.

When the lock slider 130 does the rectilinear motion, the protrusion 132 translates along the bottom surface of the movable gear 120, locking/unlocking the movable gear to/from the fixed gear 115 while moving.

On the tip of the movable gear 120, that is, on the tip end portion of the movable gear 120 where the hinge 122 is formed, there is a downward deflected portion 124 (similar to 32c of FIG. 1). An extension portion 134 is also formed on the tip end portion of the lock slider, which is close to the downward deflected portion 124.

These components have particular roles. In other words, to disengage the movable gear from the fixed gear, the lock slider 130 first should be moved rearward (toward the downward refracted portion of the movable gear, i.e. Y-direction).

At this time, the extension portion of the retreated lock slider 130 contacts with the downward deflected portion 124. If the lock slider 130 keeps retreating or moving rearward, the downward deflected portion 124 is pressed by the extension portion 134, and the rotational force or torque is applied to the movable gear 120 by the hinge 122 to a counterclockwise direction. As a result, one can easily disengage the movable gear 120 from the fixed gear 115 using a little force.

The support bracket 140 for supporting the lock slider 130 is attached to the lower portion of the lock slider 130 or both lower portion and side of the lock slider 130. The support bracket 140 not only acts as a slide guide, but also prevents the lock slider from being separated from the operation lever 150.

In addition, the load on the lock slider 130 is now transferred to the support bracket 140, not the operation lever 150, so it is possible to reduce shear stress given the operation lever 150 and any one can easily handle the operation lever 150.

If the support bracket 140 has a housing shape for encompassing the above components, slots 142 and 143 with an elongate shape in the Y-direction are preferably formed on both sides of the support bracket 140 to combine the operation lever 150 with the lock slider 130. At this time, it is better to make the slot 143 formed in the hinge 152 direction of the operation lever equal or greater than the slot 142 formed in a knob direction.

One side of the operation lever 150 is coupled to the support bracket 140 or hinged to another support member, and the aforementioned knob is formed on the other side of the operation lever 150.

The motion converter 160 is a guide groove 164 formed on the lock slider 130 where the operation lever 150 is placed. Here, the width of the guide groove 164 (the length of the guide groove in the same direction with the width of the operation lever, i.e. the length in the Y-direction) is grater than that of the operation lever 150. And a circular portion 162 having the same diameter with the guide groove 164 is additionally formed on the operation lever 150 where the guide groove is placed. Preferably, the boundary lines on both sides of the guide groove 164 are parallel to each other.

Figure 9A:
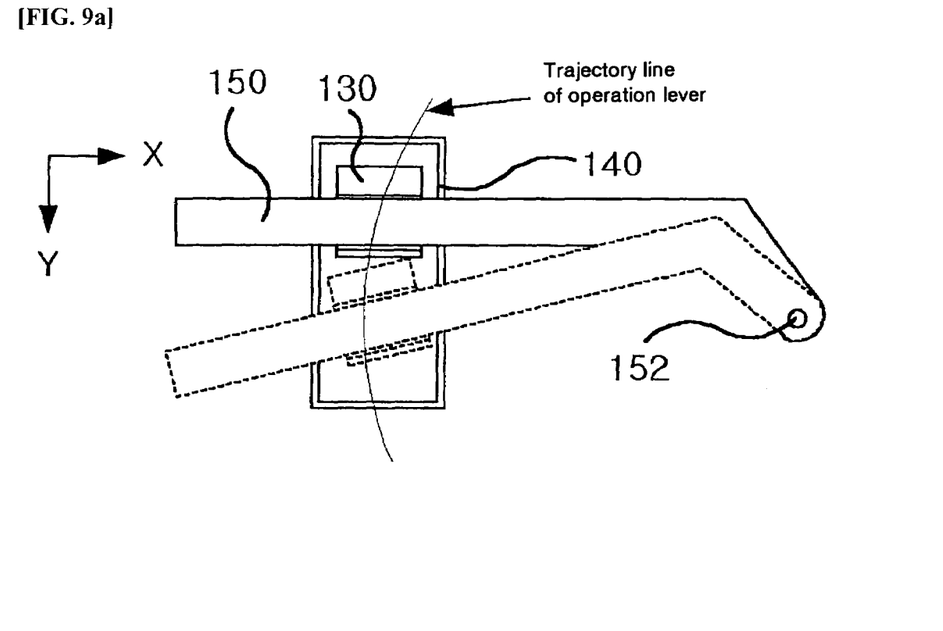
FIGS. 9a through 9c diagrammatically illustrate the tilt apparatus in operation according to one embodiment of the present invention.
Figure 9B:
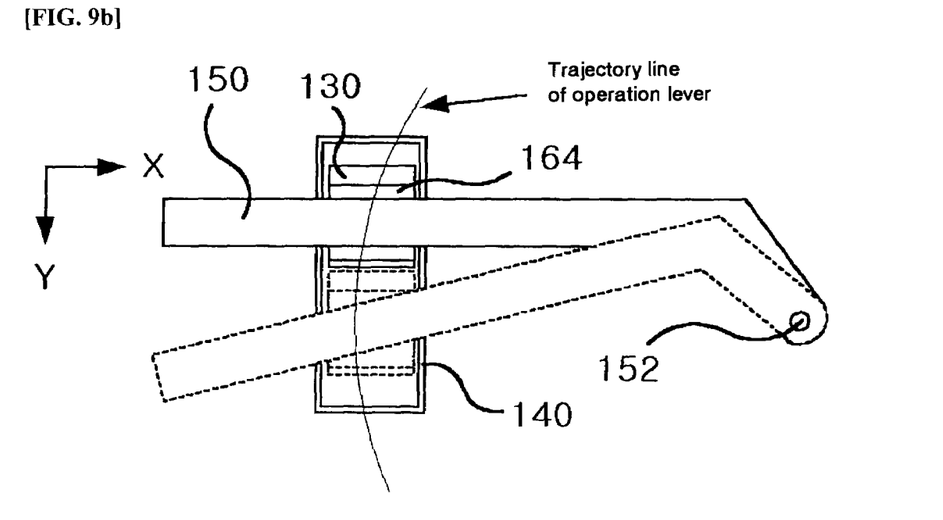
Figure 9C:
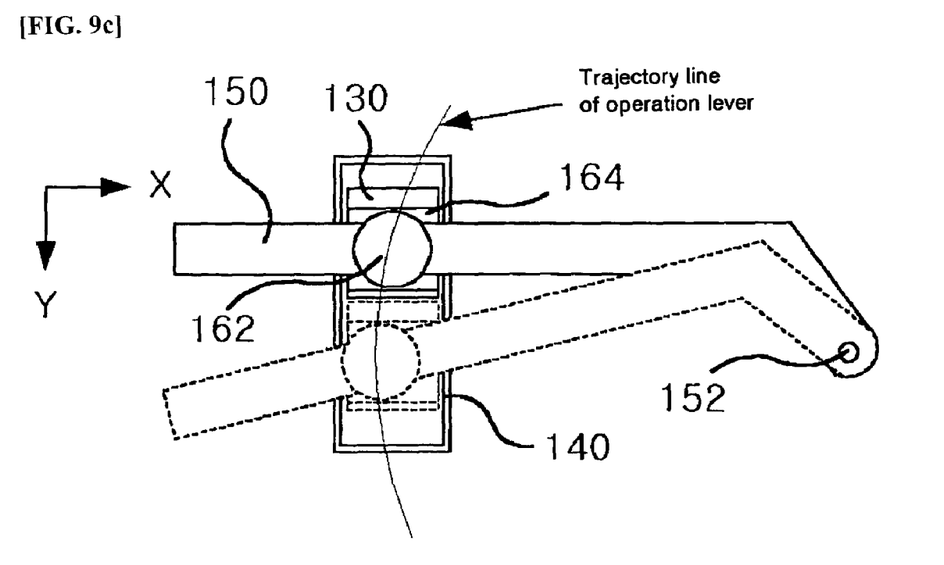

FIG. 9a depicts an operational state, in which the operation lever 150 is positioned at the guide groove 164 of the lock slider 130 as wide as the operation lever 150, FIG. 9b depicts an operational state, in which the width of the guide groove 164 is greater than the operation lever 150, and FIG. 9c depicts an operational state, in which the circular portion 162 is formed on the operation lever 150.

In the above drawings, the solid lines represent a state before the operation lever 150 rotates, and the broken lines represent a state after the operation lever 150 rotates.

As shown in FIG. 9a, the operation lever 150 and the lock slider 130 are separated from each other, and, as shown in FIG. 9b, the operation lever 150 is placed on the guide groove 164 having the almost same width with the operation lever 150. In this case, if the operation lever 150 rotates counterclockwise, that is if the movable gear 120 is disengaged from the fixed gear, the lock slider 130 translated in the Y-direction, rotating with the operation lever 150.

At this time, the lateral surface of the lock slider 130 contacts with the support bracket 140, and the lock slider 130 having the guide groove 164 thereon translates in the X-direction along the operation lever 150 by the operation of the support bracket 140.

If the gap (t2) between the support bracket 140 and the lock slider 130 is too large, it is difficult for the lock slider 130 to contact with the support bracket 140 as it pivots on the hinge 152 of the operation lever so the lock slider 130 does not translate to the X-direction. On the other hand, if the gap (t2) is too small, it means there is no enough space for the rotation of the lock slider 130, so the rotation of the lock slider 130 is likely to be obstructed by the support bracket 140. Therefore, the gap (t2) between the support bracket 140 and the lock slider 130 should be carefully set up.

Making a proper gap (t2), it is possible to reduce the space required for the rotation of the lock slider 130, especially when the lock slider 130 is combined with the operation lever 150.

Referring now to FIG. 9b, the operation lever 150 and the lock slider 130 are separated from each other, and the width of the guide groove 164 is designed to be greater than the width of the operation lever 150 to make a gap (t1) between the operation lever 150 and the borderline of the guide groove 164. In this case, if the operation lever 150 rotates counterclockwise, that is if the movable gear 120 is disengaged from the fixed gear, the lock slider 130 translated in the Y-direction, rotating with the operation lever 150.

At this time, the lateral surface of the lock slider 130 contacts with the support bracket 140, and the guide groove having a greater width than the operation lever 150 is formed on the lock slider 130. As a result, the gap (t1) is created between the guide groove 164 and the operation lever 150. As such, the lock slider no longer pivots on the hinge 152 of the operation lever, and the relative rotation phenomenon, namely only the operation lever 150 rotates and the lock slider 130 does not rotate, takes place. Instead, the lock slider 130 translates in the X-direction along the operation lever 150.

To make this possible, there should not be any gap (t2) between the lock slider 130 and the support bracket 140, and the width of the guide groove 164 should be carefully determined in order to prevent the operation lever 150 from touching the support bracket while rotating.

In this case, since the lock slider 130 does the rectilinear motion only in the Y-direction during the rotation of the operation lever 150, the bottom surface of the movable gear 120 and the protrusion 132 of the lock slider 130 can always make the line contact with each other.

However, if there is a gap (t2) between the support bracket 140 and the lock slider 130, when the operation lever 150 rotates, the lock slider 130 cannot avoid touching the support bracket 140 after pivoting on the hinge 152 of the operation lever. In this case, the lock slider 130 does not only the rectilinear motion in the Y-direction, but also the rotational motion around the hinge 152 of the operation lever. In consequence, the bottom surface of the movable gear 120 and the protrusion 132 of the lock slider 130 make the point contact, not the line contact.

In case of FIG. 9c, the operation lever 150 and the lock slider 130 are separated from each other, and the width of the guide groove 164 is designed to be greater than the width of the operation lever 150, and the circular portion 162 is formed on the operation lever 150. As already discussed in FIG. 9b, when the operation lever 150 rotates, the lock slider 130 does not rotate but does the rectilinear motion in the Y-direction instead, whereby the bottom surface of the movable gear 120 and the protrusion 132 of the lock slider 130 can always make the line contact with each other.

Needless to say, there should be no gap (t2) between the lock slider 130 and the support bracket 140 in this case as well, and the width of the guide groove 164 should be carefully determined in order to help the operation lever 150 to be able to rotate.

Forming on the operation lever 150 the circular portion 162 with an almost same diameter with the guide groove 164, it is possible to minimize the gap associated with the relative motion between the guide groove 164 of the lock slider 130 and the operation lever 150, and prevent the lock slider 130 from fluctuating in the guide groove 164, and allow the lock slider 130 to be at appropriate position for the rotation of the operation lever 150.

Although the circular portion 162 can be formed by placing a separate circular member on the operation lever 150, it is better to form the circular portion by transforming the operation lever 150 to have a same arc in both sides of the operation lever 150.

Also, the guide groove 164 can be designed to pass through the lock slider 130, or formed on the top surface of the bottom surface of the lock slider 130, respectively.

In this particular embodiment, the guide groove 164 is formed on the top surface of the lock slider 130.

The motion converter 160 can be formed when the operation lever 150 and the lock slider 130 are coupled to each other through a hinge 236.

Figure 10:
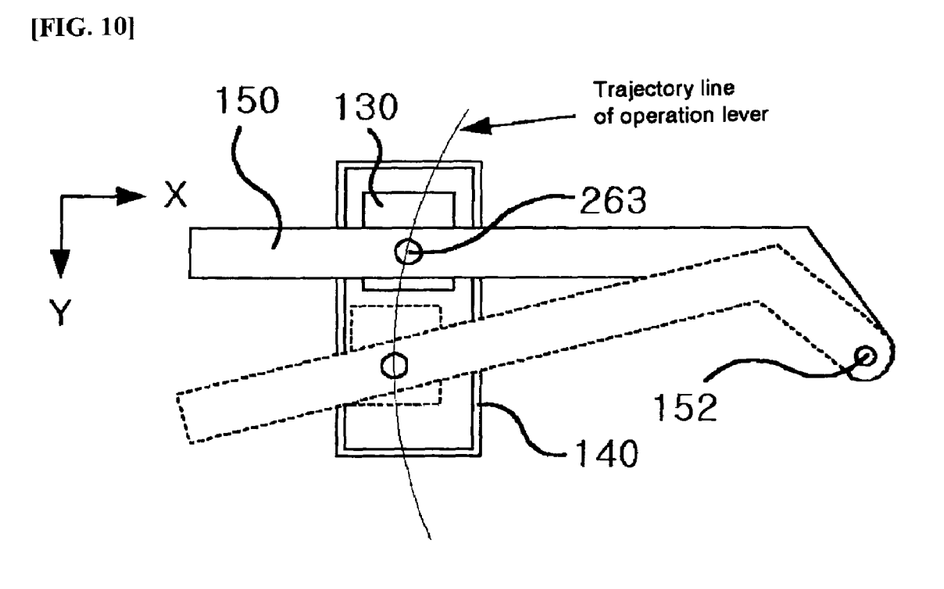
FIG. 10 diagrammatically illustrates a tilt apparatus in operation according to another embodiment of the present invention.

FIG. 10 diagrammatically illustrates a tilt apparatus in operation according to another embodiment of the present invention.

As shown in FIG. 10, the operation lever 150 and the lock slider 130 are coupled to each other through a hinge 236 in a Z-direction. In general, a pin or a shaft is used as the hinge member to connect the operation lever 150 to the lock slider 130.

Even though the hinge 236 of the lock slider 130 is supposed to be formed on the central portion of the lock slider 130, in some situations, it can be designed to be eccentric.

Further, the operation lever 150 and the lock slider 130 can be hinged by placing the operation lever 150 on the upper portion or the lower portion of the lock slider 130, or the operation lever 150 can be hinged 236 to the lock slider in such a manner to pass through the lock slider 130.

In case the operation lever 150 and the lock slider 130 are hinged together after disposing the operation lever 150 on the upper portion or the lower portion of the lock slider 130, another groove like the guide groove 164 should be formed on the lock slider 130 to prevent the junction portion of the hinge 236 from contacting with the bottom surface of the movable gear 120 and the support bracket 140.

If a new guide groove 164 is formed on the lock slider 130, the width of this new guide groove 164 should be carefully determined in order to secure enough space or gap (t1) for the operation lever 150 to be able to freely rotate.

On the other hand, if the operation lever 150 passes through the lock slider 130, a passing hole (not shown) should also be large enough for the operation lever 150 to be able to freely rotate.

When the operation lever 150 rotates, although the lock slider 130 translates in the Y-direction by the operation lever 150 and at the same time pivots on the hinge 152 of the operation lever, the lock slider 130 itself is not rotated due to its contact with the support bracket 140 and the hinge 236 of the lock slider.

More specifically, when the operation lever 150 rotates, the lock slider translates in the X- and Y-directions. Because the lock slider itself is not rotated at this time, the bottom surface of the movable gear 120 and the protrusion 132 of the lock slider 130 can make the line contact.

To make the above possible, the support bracket 140 and the lock slider 130 should be spaced out having an appropriate gap (t2) therebetween.

Also, a separate hinge member can be employed to hinge the operation lever 150 and the lock slider 130. In such case, the lock slider 130 does the rectilinear motion by the operation of the operation lever 150.

Preferably, a spring 145 is attached to the tip portion of one side and/or the other side of the lock slider 130, to provide a resilient force to the lock slider 130.

In particular, one side of the spring 145 is attached to the tip portion of one side and/or the other side of the lock slider 130, and the other side of the spring 145 is attached in +Y- or −Y directions to the support bracket 140 or another component.

Besides the spring 145, other kinds of resilient members can also be utilized as long as they give the resilient force to the lock slider 130.

The equivalent effect is obtained when the spring 145 is attached not only to the lock slider 130 but also to the operation lever 150.

In this case, one side of the spring 145 is connected to the operation lever 140, and the other side of the spring 145 is connected in +Y- or −Y directions to the support bracket 140 or another component. The best way is illustrated in FIG. 7. That is, a spring support member 147 for retaining the spring 145 is mounted on the support bracket 140.

One end of the spring support member 147 is opened to allow the spring 145 to be inserted therein, and the other end of the spring member 147 is closed to support the spring 145.

Preferably, a slot 148 similar to the slots 142 and 143 of the support bracket 140 is formed on the lateral surface of the spring support member 147. This is because the operation lever 150 should pivotably move on the hinge 152.

The following explains the operational procedure of the tilt steering apparatus for a vehicle having the above constitution.

At first, if the driver wants to adjust the position of the upper steering column 100, he needs to pull the operation lever 150.

Then the operation lever 150 having one end hinged 152 does the rotational motion, and the lock slider 130 combined with the operation lever 150 is linearly moved rearward in the Y-direction along the bottom surface of the movable gear 120, while being supported by the support bracket 140.

The extension portion of the lock slider 130 pushes the downward deflected portion 124 in the Y-direction so that the movable gear 120 can pivot counterclockwise upon the hinge 122.

Then the fixed gear 115 is released, and the driver can adjust the upper steering column 100, centering the hinge 104 about the lower steering column 102.

Once the upper steering column 100 is adjusted as desired, the driver slacks off the operation lever 150. Then the lock slider 130, by the elastic force from the spring 145, translates in the Y-direction along the bottom surface of the movable gear 120, while being supported by the support bracket 140.

As the lock slider 130 moves, the movable gear 120 pivots clockwise on the hinge 122, and is engaged with the fixed gear 115 again.

In conclusion, the tilt steering apparatus for a vehicle according to the present invention can be advantageously used for the following reasons.

First, the tilt apparatus has a very simple structure. Thus, its assembling work is correspondingly easy and the cost of manufacture is substantially reduced. The fixed gear and the movable gear are more securely toothed to each other by the operation of the operation lever. As the operation lever and the lock slider are more stably combined with each other, one can operate the operation lever at a minimum force, and noise from the fraction between the two components is reduced, and troubles, if they occur, are likely to be resolved easily.

Second, the support bracket for supporting the lock slider is advantageous not only for guiding the translation of the lock slider, but also for preventing the lock slider from separating from the operation lever.

Also, applying the load on the lock slider to the support bracket instead of the operation lever, it is possible to reduce the shear stress on the operation lever, and one can more easily operate the operation lever without much force.

If the support bracket has a housing shape for encompassing other components, the components are less likely to be separated or lost. As such, the driver's knees are not necessarily contacted with the components, and protected from being hurt.

Third, separating the operation lever and the lock slider from each other, it is possible to simplify the complicated structure for combining them together during the manufacture, and the two components can be easily assembled even in a small space. Moreover, if there is a need to change one of them, only the component in trouble can be exchanged. Hence, a great deal of cost can be saved in this way.

Fourth, since the width of the guide groove is greater than that of the operation lever, there is a gap between the guide groove of the lock slider and the operation lever. As a result, when the operation lever rotates, the lock slider does only the rectilinear motion. Even when the operation lever rotates more or less than it is supposed to in the locking position because of a minor error in the manufacture of components, because the lock slider moves linearly only, the lock slider and the movable gear can always have the line contact with each other. Therefore, the supporting rigidity and the abrasion resistance of the lock slider and the movable gear are greatly improved.

The line contact between the operation lever and the lock slider can be reinforced by hinging them together.

Fifth, additionally forming circular portion on the operation lever that is supposed to be placed in the guide groove of the lock slider, it becomes possible to minimize the gap between the guide groove and the operation lever in relation to the relative motion therebetween, and prevent the lock slider from fluctuating against the operation lever.

Sixth, according to the present invention, the downward refracted portion is additionally formed on the tip portion of the one side of the movable gear, and the extension portion is additionally formed on the tip portion of the one side of the lock slider. Therefore, when the movable gear needs to be disengaged from the fixed fear, the extension portion pushes the downward refracted portion and the movable gear pivots counterclockwise upon the hinge, making the disengagement of the movable gear much easier.

Seventh, the spring is attached to the tip end portion of one side and/or the other side of the lock slider. Therefore, if the driver slacks off the operation lever after adjusting the angle of the steering column by moving the lock slider rearward, the lock slider, by the elastic force from the spring, returns to its original position. In this manner, the movable gear is very easily locked to the fixed gear.

The equivalent effect can be obtained by attaching the spring to the operation lever.

Eighth, the spring member for holding and supporting the spring is further installed. Therefore, when the spring is compressed by the operation lever, the spring is not bent or twisted but compressed straight, and thus its elastic force is increased. Also, the spring is not easily separated, and the driver's knees are less likely to be hurt by the contact with the spring.

While the invention has been described in conjunction with various embodiments, they are illustrative only. Accordingly, many alternative, modifications and variations will be apparent to persons skilled in the art in light of the foregoing detailed description. The foregoing description is intended to embrace all such alternatives and variations falling with the spirit and broad scope of the appended claims.

The invention claimed is:

1. A tilt steering apparatus for a vehicle, comprising:
   a lower bracket mounted on a steering column;
   a fixed gear formed on a bottom surface of the lower bracket;
   a movable gear having a top surface toothed to the fixed gear, the movable gear being pivotably movable on a hinge formed at one side thereof;
   a lock slider that disengagably locks the movable gear to the fixed gear;
   a support bracket that supports the lock slider;
   an operation lever having one side hinged for rotation; and
   a motion converter that converts a rotational motion of the operation lever to a rectilinear motion of the lock slider, wherein the lock slider is provided with a guide groove configured to detachably receive the operation lever therein.

2. The apparatus according to claim 1, wherein the motion converter comprises the guide groove formed on the lock slider so as to position the operation lever.

3. The apparatus according to claim 2, further comprising:
   a downward deflection portion formed on a tip portion of one side of the movable gear; and
   an extension portion formed on a tip portion of one side of the lock slider, wherein the downward deflection portion and the extension portion contact with each other when the movable gear is released.

4. The apparatus according to claim 2, wherein a spring is attached to the tip portion of the lock slider.

5. The apparatus according to claim 2, wherein a spring is attached to the operation lever.

6. The apparatus according to claim 2, wherein a width of the guide groove is greater than a width of the operation lever.

7. The apparatus according to claim 6, further comprising:
   a downward deflection portion formed on a tip portion of one side of the movable gear; and
   an extension portion formed on a tip portion of one side of the lock slider, wherein the downward deflection portion and the extension portion contact with each other when the movable gear is released.

8. The apparatus according to claim 6, wherein a spring is attached to the tip portion of the lock slider.

9. The apparatus according to claim 6, wherein a spring is attached to the operation lever.

10. The apparatus according to claim 6, wherein a circular portion having a diameter equal to the width of the guide groove is formed on the operation lever disposed in the guide groove.

11. The apparatus according to claim 10, further comprising:
    a downward deflection portion formed on a tip portion of one side of the movable gear; and
    an extension portion formed on a tip portion of one side of the lock slider, wherein the downward deflection portion and the extension portion contact with each other when the movable gear is released.

12. The apparatus according to claim 10, wherein a spring is attached to the tip portion of the lock slider.

13. The apparatus according to claim 10, wherein a spring is attached to the operation lever.

14. The apparatus according to claim 10, wherein borderlines on both sides of the guide groove are parallel to each other.

15. The apparatus according to claim 14, further comprising:
    a downward deflection portion formed on a tip portion of one side of the movable gear; and
    an extension portion formed on a tip portion of one side of the lock slider, wherein the downward deflection portion and the extension portion contact with each other when the movable gear is released.

16. The apparatus according to claim 14, wherein a spring is attached to the tip portion of the lock slider.

17. The apparatus according to claim 14, wherein a spring is attached to the operation lever.

18. The apparatus according to claim 1, wherein the motion converter is formed by hinging the operation lever and the lock slider together.

19. The apparatus according to claim 18, further comprising:
    a downward deflection portion formed on a tip portion of one side of the movable gear; and
    an extension portion formed on a tip portion of one side of the lock slider, wherein the downward deflection portion and the extension portion contact with each other when the movable gear is released.

20. The apparatus according to claim 18, wherein a spring is attached to the tip portion of the lock slider.

21. The apparatus according to claim 18, wherein a spring is attached to the operation lever.

22. The apparatus according to claim 1, wherein a bottom surface of the movable gear is curved.

23. The apparatus according to claim 22, further comprising:

a downward deflection portion formed on a tip portion of one side of the movable gear; and an extension portion formed on a tip portion of one side of the lock slider, wherein the downward deflection portion and the extension portion contact with each other when the movable gear is released.

24. The apparatus according to claim 22, wherein a spring is attached to the tip portion of the lock slider.

25. The apparatus according to claim 22, wherein a spring is attached to the operation lever.

26. The apparatus according to claim 1, further comprising:

a downward deflection portion formed on a tip portion of one side of the movable gear; and an extension portion formed on a tip portion of one side of the lock slider, wherein the downward deflection portion and the extension portion contact with each other when the movable gear is released.

27. The apparatus according to claim 1, wherein a spring is attached to the tip portion of the lock slider.

28. The apparatus according to claim 1, wherein a spring is attached to the operation lever.

29. The apparatus according to claim 28, wherein the support bracket comprises a spring support member that retains the spring.

* * * * *